United States Patent
Yasue et al.

[19]

[11] Patent Number: 5,885,679
[45] Date of Patent: *Mar. 23, 1999

[54] JOINING STRUCTURE FOR WATERPROOF FABRIC

[75] Inventors: Masaharu Yasue, Uji; Masami Kamiya, Kawanishi, both of Japan

[73] Assignee: Asahi Kasei Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 836,464

[22] PCT Filed: Nov. 17, 1995

[86] PCT No.: PCT/JP95/02365

§ 371 Date: Jun. 27, 1997

§ 102(e) Date: Jun. 27, 1997

[87] PCT Pub. No.: WO96/16220

PCT Pub. Date: May 30, 1996

[30] Foreign Application Priority Data

Nov. 18, 1994 [JP] Japan .................................. 6-285091

[51] Int. Cl.⁶ .............................. B32B 3/10; B32B 31/14
[52] U.S. Cl. ........................... 428/57; 156/73.4; 156/73.5
[58] Field of Search ............................. 428/57; 156/73.4, 156/580.1, 73.5

[56] References Cited

U.S. PATENT DOCUMENTS 4,461,662  7/1984  Onishi ..................................... 156/73.4

FOREIGN PATENT DOCUMENTS

| 25 43 047 | 4/1977 | Germany . |
| 56-500019 | 1/1981 | Japan . |
| 56-53273 | 5/1981 | Japan . |
| 2-44946 | 10/1990 | Japan . |
| 3-36553 | 8/1991 | Japan . |
| 6-246076 | 9/1994 | Japan . |
| 641576 | 8/1950 | United Kingdom . |
| 2 071 564 | 9/1981 | United Kingdom . |

OTHER PUBLICATIONS

Derwent Abstract No. 86–046091 to Shimada dated Jan. 6, 1986 (which document relates to Japanese Patent Application No. 61–000666).

Derwent Abstract No. 90–144962 to Fujita dated Apr. 3, 1990 (which document relates to Japan Patent Application No. 02–092519).

*Primary Examiner*—Alexander Thomas
*Attorney, Agent, or Firm*—Finnegan, Henderson, Farabow, Garrett & Dunner, L.L.P.

[57] ABSTRACT

An improved joining structure for a waterproof fabric composed of a base fabric with a soft (elastomeric) resin film adhered thereon is provided. The joining structure is formed in a welt seam in which a hot-melt resin adhesive layer is interposed as a part of intermediate layers of the structure. The joining structure has properties of (1) bond strength $\geq 25$ kg/25 cm width, (2) bending stiffness $\leq 20$ gf·cm²/cm and (3) water resistance after rubbing 1,000 times according to Scott shape method $\geq 800$ mm $H_2O$.

The joining structure can be formed by a method including joining the waterproof fabrics to form a welt seam with a hot melt resin layer put between and following that applying a high-frequency welding to the welt seam portion at a condition with an insulating elastic sheet interposed between the welt seam portion and electrode means to cause the hot-melt resin to be melted.

7 Claims, 5 Drawing Sheets

JOINING STRUCTURE FOR WATERPROOF FABRIC

FIELD OF THE INVENTION

This invention relates to a water-resistant joining structure for waterproof fabric and method for forming a water-resistant joining structure for textile goods converted from a waterproof fabric. Specifically, a joining structure portion, in which waterproof fabrics with coatings of a thermoplastic elastomeric resin film layer on their respective base fabrics are joined together, provides a water-resistant joining structure having an exceedingly durable waterproof property together with an excellent pliability in bending while having an outward appearance of a seam similar to those of conventional cloths. The present invention provides a method of producing such a structure.

BACKGROUND ART

A waterproof fabric comprising a base fabric with a resin coating thereon, especially a moisture (water vapor) permeable waterproof resin coating has been used in a broad range of clothes, for example, sport clothes such as windcheaters, waterproof work wear for use in rainy weather, and waterproof uniforms (coats and loose jackets). These uses take advantage of the moisture permeability and waterproof properties of the waterproof coated fabric.

A waterproof garment made of waterproof fabric is, in general, produced by joining cloth pieces, which are cut to desired shape from a waterproof fabric, together into a welt seam (to give a decorative effect and to prevent seam catching or so called mimesis) by sewing, and thereafter laminating a sealing tape on the inner side of the welt seam portion. For this reason, there is encountered a problem in which the seamed portion of the garment becomes exceedingly less waterproof than the waterproof fabric material itself.

Further, a sealing tape cannot be applied in the prior art unless a garment is made of a fabric constructed of a small denier filamentary yarn. This is because an expected waterproof property cannot be obtained when a sealing tape is applied to the fiber surface of the base fabric of a waterproof fabric with a resin coating on its right side, especially when the base fabric of a waterproof fabric is a knitted fabric such as tricot which is made of a large denier filamentary yarn or spun yarn made of staple fiber.

In case where a sealing tape is applied onto the back side of a waterproof fabric, the joining seam portion becomes stiff due to both the application of the sealing tape and lack of close contact between the sealing tape and the base fabric.

Still another drawback encountered in the application of sealing tape is that a joining seam may cause an insufficiency in waterproof property when a sealing tape is readily buckled or poorly disposed, off the run of stitches, due to the presence of a bent or curved run of stitches in a seam structure. Accordingly, use of straight-line stitching has been the only way to avoid an occurrence of buckling and/or slipping-off of sealing tape over the stitching line. Use of a straight line stitching, however, greatly restricts the possible range of garment design.

In the manufacturing clothes such as sport clothes such as windcheaters and the like, rain wear, waterproof work wear from a waterproof fabric composed of a base fabric and thermoplastic resin film layer, it has been known that high-frequency welder, an ultra-sonic welder and the like have been used for obtaining a joining bond free from sewing stitches between overlapping faces of base fabrics, with or without the use of adhesive, in order to prevent joining interfaces of fabrics (or cloths) being penetrated by water.

These known methods of joining by means of a welded bond by a high-frequency welder can produce waterproof joining bonds in which the waterproof property is maintained only at an early stage of their use. However, joining bonds obtainable by the known method of melt adhesion bonding gives, on the whole, relative low bond strengths when being compared with those of joining seams obtained by sewing. Besides, the joining bonds by the known methods tend to be stiff and easily damaged and/or split, therefore they have a drawback in durability of the waterproof properties under repetitive use over a long time.

Figure 13:
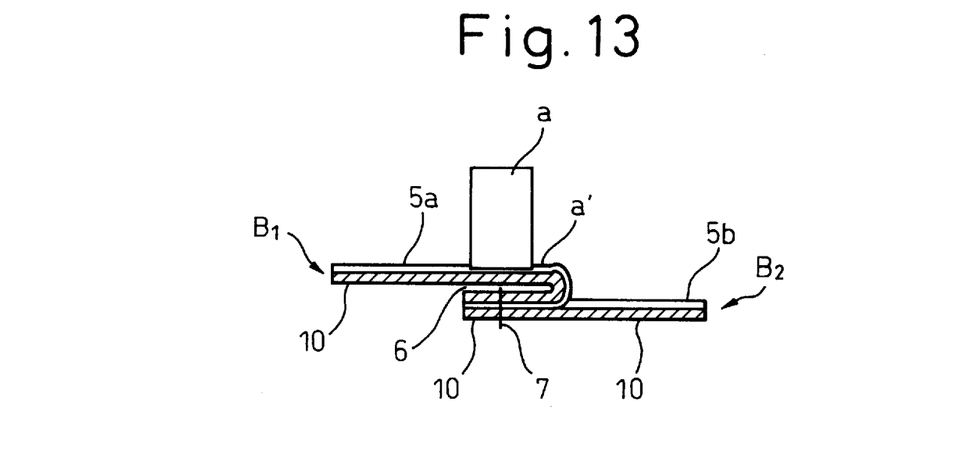
FIG. 13 is an illustrative figure showing a known method of forming a joining seam structure for waterproof fabric with the use of a high frequency welding technique.

An improved method for obtaining a joining structure both waterproof and strong is proposed, for example, in Japanese Examined Utility Model Publication No. 62-24516 in which formation of a strong joining structure obtained by sewing with use of sewing thread is followed by an application of a high-frequency welding. FIG. 13 illustrates a cross-section view of a waterproof joining structure described in the above-mentioned known art. In the figure, there is shown a joining structure comprising a two pieces ($B_1$) and ($B_2$) of waterproof fabrics in which the top waterproof layers (5a) and (5b) of a thermoplastic synthetic resin, for example, vinylchloride, are coated on each one faces of the base fabric layers (10) of the waterproof fabric pieces ($B_1$) and ($B_2$). The top surface of waterproof layers (5a) and (5b) of waterproof fabric pieces ($B_1$) and ($B_2$) are laid one over the other, on which a piece of thermoplastic adhesion bonding tape (6) is disposed. A set of these layers en bloc is, then, sewn together along the marginal end with a sewing thread (7), and then piece ($B_1$) of the waterproof fabric, which is in contact with the above-mentioned adhesion bonding tape (6), is folded back over the top face of the adhesion bonding tape. The folded structure en bloc is then heated by pressing by means of an electrode plate (a) to form a waterproof joining structure of a waterproof fabric in which waterproof layers (5a) and (5b) and adhesion bonding tape (6) are bonded by hot press adhesion.

The method explained above can produce a joining structure having a bonding strength of greater than 25 kg/2.5 cm width with improved durability. However, the joining structure has a tendency to deteriorate at the melt-binding portion of waterproof layers (5a) and (5b) and that an irregularity in the thickness of the joining structure is easily produced, since the waterproof layers of waterproof fabric and the heat welding tape are melted to form a press mark (a') of the mold of high-frequency welder on the surface of the waterproof fabric. Further, the joining structure is stiff to the touch (the bending resistance in terms of bending modulus exceeds 20 gf·cm$^2$/cm) as well as a tendency to be easily cracked and/or split (water resistance of a specimen after being rubbed 1,000 times according to Scott shape method: not greater than 800 mm $H_2O$). Besides, it has been observed that the joining structure is not easy to fit to a wearer's body and lacks a property of dynamic fitability (following-up the wearer's body motion). For this reason, the known method mentioned above cannot produce waterproof fabric having properties satisfying both waterproof and joining bond properties.

Japanese Examined Utility Model Publication No. 61 (1986)-31749 discloses that a method of sealing a seam portion in which a piece of a sheet capable of developing foam is joined together between a pair of pieces of fabric by a sewing thread and is heated to generate foam in the sheet. According to the method, the sheet is forced to grow 10 fold (3 to 4 fold as large in the examples) as large as its original size by blowing with the use of blowing agent so that the needle holes can be sealed to a certain degree. It does, improve the waterproof properties because needle holes filled with the porous material have a low resistance to water. Further, the seam structure can be readily deformed due to an increased thickness of the seam portion and the shape of the seam portion lacks a property of dynamic fitability (following-up the wearer's body motion). As a result, the method cannot produce a seam structure which satisfies the durability requirement for waterproofness and resistance to water under a prolonged use, especially in case where clothes are worn for a long time. In addition, a problem of deterioration of the waterproof layer due to heat treatment by external heating means occurs.

In Japanese Unexamined Patent Publication No. 6 (1994)-246076, there is described a method for forming a joining seam structure for waterproof cloths exhibiting a water resistance at a level required for an umbrella fabric in which the cloths are made of a moisture permeable waterproof fabric composed of a thermoplastic resin layer coated on one face of the base fabric having a water resistance greater than 500 mm $H_2O$. As described in the publication, the known joining structure has a water resistance of about 500 mm $H_2O$ and is produced by making a joining structure containing a welt seam comprising a combweb like spun fiber web tape, or film of a hot melt resin having a basis weight of about 30 to 100 $g/m^2$ interposed along a stitching line between an overlap of a waterproof fabrics, and thereafter melting the hot melt resin so that a joining structure having a water resistance of about 500 mm $H_2O$ is formed.

DISCLOSURE OF THE INVENTION

An object of the invention is to provide a waterproof joining structure having a water resistance of greater than 800 mm $H_2O$ for use in the manufacture of rain wear for sports wear, work wear and uniforms from a durable waterproof fabric comprising a base fabric with a resin coating layer thereon.

A further object of the present invention is to provide a durable waterproof joining structure whose appearance and hand are as good as those obtained in conventional clothes.

The object of the invention is achieved by a joining structure for waterproof fabric which contains a welt seam joining an overlap of two layers of the waterproof fabrics laid one on top of the other composed of a thermoplastic resin film layer adhered to on one surface of a base fabric, characterized in that the overlapping layers of the waterproof fabrics are adhesively bonded together with an interposed hot-melt resin adhesive layer in a welt seam portion, and the welt seam portion has properties satisfying the formulae as follows:

(1) bond strength ≧25 kg/25 cm width
(2) bending stiffness ≦20 gf·cm²/cm
(3) water resistance after rubbing 1,000 times according to Scott shape method ≧800 mm $H_2O$ In the joining structure as above, the welt seam, which is also called a hirafusenui seam, means a common seam structure formed by sewing which serves as both a press for holding the seam allowance and arresting occurrences of frayed edge in the seam allowance. In sewing practice, a welt seam can be formed by; ① a method comprising folding back a seam allowance on one side, cutting off the inside fold to an appropriate fold length and sewing only the outside fold of the seam allowance with the right side of cloth by sewing; ② a method comprising folding back the seam allowance and sewing the fold with the right side cloth. Various embodiments will be explained in detail later.

An embodiment of the joining structure of the invention is a structure in which a welt seam portion contains one waterproof fabric which is folded back sandwiching a hot-melt resin layer on the fiber face of its base fabric and another waterproof fabric which is placed on top of the fold with another hot-melt resin layer interposed on its resin coating layer, and the hot-melt resin layers are melted to effect an adhesion bond.

Further, the joining structure of the invention includes a joining structure containing a welt seam which comprises a first waterproof fabric folded back with its fiber surface of the base fabric facing inside while holding a hot-melt resin layer in the fold, a second waterproof fabric folded back with its resin coated film layer facing inside while holding another hot-melt resin layer in the fold, and the folds being laid in an overlapping manner so that each coating layer of the respective waterproof fabric at the end of the respective folds is in contact with the hot-melt resin layer held by each other fold to effect melt adhesion bond.

The joining structure of the invention can be obtained by a method in which waterproof fabrics are first overlapped with a hot-melt resin layer interposed at a welt seam portion, and thereafter the overlap structure containing the welt seam portion is put in contact with the electrode of a high frequency welder under pressure with the interposition of an elastic sheet therebetween for application of high frequency electricity application to set the overlapped structure by melting the resin coating layers and the hot-melt resin layer.

In this way, the waterproof fabric of the present invention attains a waterproof characteristic in which the three specific properties mentioned before are not easily deteriorated even after a repeated wearing for a long period of time, and in addition thereto, it provides clothes with a nice body fitting performance with a good appearance and soft touch.

Namely, if a water resistance after rubbing 1,000 times according to Scott shape method becomes less than 800 mm $H_2O$, the joining structure cannot be satisfactory for garment use because the durability required for a waterproofed garment cannot be maintained. Further, when a bonding strength is less than 25 kg/2.5 cm width, it seems likely not only that the bond in the joining structure may be split and/or comes off during wearing, but also that the joining structure may lack the mechanical strength required for clothes. Still further, when a bending stiffness exceeds 20 gf·cm²/cm, the joining seam portion may becomes stiff and tend to stick out or bulge so that it may cause clothes to lack nice body fitness and to spoil a property of dynamic fitability (following-up to a motion of the wearer's body). Still further, it has been observed that the mechanical strength of the level mentioned above cause a joining portion to frail which gives rise to consequential development of cracks due in the joining to stiffness, and that it presents a cause of deterioration of the water resistance property of a joining structure.

In the present invention, the waterproof fabric is defined as a fabric structure composed of a textile base fabric with a resin coating thereon, and having waterproof resistance of greater than 800 mm $H_2O$, preferably from 1,000 mm $H_2O$ to 80,000 mm $H_2O$, and more preferably from 1,500 mm $H_2O$ to 50,000 mm $H_2O$. The above-mentioned base fabric includes woven fabric, knitted fabric, nonwoven fabric and the like. As fibers for preparation of the base fabric, natural fiber such as cotton, wool and the like, regenerated fiber such as viscose rayon, cuprammonium rayon and the like, synthetic fiber such as polyamides, polyesters, acrylics and the like can be used alike. A textile base fabric can be a woven fabric made of a composite of the fibers enumerated above.

For a waterproof fabric especially designed for protection against cold which is composed of a textile base fabric with a resin coating thereon, a thick or bulky fabric, a rugged surfaced fabric, for example, piled fabric, napped tricot such as plush knitted fabric can be used especially as the base fabric. In this case, the advantageous merit of the present invention is most successfully obtained.

A resin coating for the waterproof layer constituting of a waterproof fabric can be either a porous or nonporous coating, and can be formed by a coating or a lamination technique from polymeric materials. The polymeric materials include a rubber based polymer, polyurethanes, polyesters, polyacrylics, polyamides, polyvinylchlorides, polyfluorines and the like. The coating or film layer, as of a waterproof fabric, is preferably a moisture permeable coating layer which exhibits a moisture permeability of greater than 2,500 $g/m^2 \cdot 24$ hr, preferably 4,000 $g/m^2 \cdot 24$ hr.

The waterproof fabric is made use of as a material for making clothes and tents and the like. In the clothes field, the fabric is used for producing outdoor sport garments such as windcheaters, waterproof work wear for use in rainy weather, waterproof uniforms (coats and or loose jackets). In these articles, the waterproof fabric is converted to an article of clothing containing a waterproof joining structure which has a water resistance of greater than 80 mm $H_2O$.

The hot-melt resins which can be used in the invention, include copolymers of polyamides, copolymers of acrylic acid, ethylenevinylacetate copolymers and the like. Use is made of these resins in the form of either tape or spun bond-like nonwoven like form. Of these resins, a copolyamide type resin is most preferred. It is preferable for attaining a uniform melting of the hot-melt resin that use is made of a hot-melt resin having a dielectric coefficient of from 4.0 to 4.7, a dielectric power factor of from 0.05 to 0.13 and a product of dielectric coefficient and dielectric power factor being in a range from 0.2 to 0.6.

The hot-melt resin material is used, for example, in the form of a tape which is prepared by cutting a film of the resin. When the tape is put over the top of a waterproof fabric or cloth to be joined by sewing, it can be sewn together along its edge portion into a joining structure if a straight line of stitches is to be made. In case where a curved line of stitches or winding line of stitches should selectively be formed for a joining structure, it is difficult to form such line of stitches along its edge portion of a joining structure because failure of stitching, for examples, doubled stitches and missing stitches, and formation of creases readily occur. For this reason, it is preferred to use a sealing material having a structure capable of following up every mode of stitching line. A flexible spun bond-like hot-melt resin such as, for example, Daiamid 1,400 available from Daicel Chemical Industries Co., Ltd., can be most suitably used.

Such a typical example of spun bonded nonwoven hot-melt resin such as mentioned above, there is given a spun bond like continuous sheet of a bonded accumulated mass of cobweb-like film (spun fiber web) prepared by spinning a hot-melt resin spirally through nozzles by an extrusion process. With the use of such spun bonded nonwoven like form hot-melt resin as mentioned above, formation of waterproof seam portion can be obtained without fail because even a curved line of stitches can be followed successfully.

In case where a hot-melt resin is used in the form of sheet, it is preferred that a sheet has a basis of weight ranging from 30 $g/m^2$ to 300 $g/m^2$, preferably from 50 $g/m^2$ to 200 $g/m^2$ and a width of from 5 mm to 20 mm preferably from 10 mm to 15 mm.

An overlap (superposed layers) containing a welt seam which is formed by joining together by sewing is transferred to a high-frequency welder (a high-frequency heat sealing machine), and the overlap is placed on the lower-electrode of the welder so that the seam portion to be melt bonded by hot press adhesion is set at a pressing position by the mold fixed to the upper electrode, and the seam portion is brought to hot-melt press adhesion.

For operating the hot-melt press adhesion bonding by a high-frequency welder, it is necessary that a high-electric-insulating high-tenacity sheet should be interposed between joining seam portion and electrodes when electricity is turned on. With the interposition of such insulating material, a hot-melt resin layer can be melted through out because the distance between the hot-melt resin layer and the electrode can be kept constant over the contacting area at all times regardless of conditions such as structural shape, surface rigidity, specifications of yarns and weave construction of a base fabric. As a result, a uniform adhesive bond by a hot-melt resin layer in the joining seam structure; film shape formation; following-up the rugged stitched shape; and formation of thin film are effected. In consequence, a durable waterproof joining structure having the above-mentioned properties and appearance can be produced.

In order to obtain the function and advantageous merit as mentioned above, an insulating elastic sheet should have a thickness of from 2 mm to 10 mm preferably from 3 mm to 7 mm and its thickness change ratio at a compression load of 2 $kg/cm^2$ ranges from 4/5 to 1/10. From an insulating elastic sheet having a good elastic compression recovery of which a thickness change ratio of from 3/5 to 1/5, a selection should be made of a material having an elevated softening point and melting point. The elastic sheet preferably has a dielectric constant of from 3.2 to 4.7, a dielectric power factor of from 0.002 to 0.02 and a product of dielectric constant and dielectric power factor of from 0.06 to 0.09. When a product of a dielectric constant and a dielectric constant of an elastic insulating sheet are less than half, especially less than ¼ of a hot-melt resin material, only the hot melt resin can be uniformly melted efficiently and a selection in this range is preferable. As preferred elastic insulating elastic sheet materials, for example, an insulating rubbery sheet of silicon, urethane or the like, a calendered layer of vulcanized insulating rubber compound on a cotton or silk base fabric, a foamed synthetic resin sheet and the like can be used.

Following are given as methods of interposition of an insulating elastic sheet. Heat evolution of a polymeric material on a high-frequency welding machine is obtained in proportion to a product of dielectric constant and respective values of dielectric power factor of a specific polymer. Accordingly, it is important that the respective values of dielectric constant and dielectric power factors for a hot-melt resin material and thermoplastic coating material for the waterproof layer of waterproof fabric should be controlled within a given optimized range.

① A method in which the sheet shaped to a mold is adhered to the metal mold mounted on the upper electrode by a double adhesive-coated tape or an adhesive.

② A method in which the elastic sheet which is of a size a little larger than the upper-mold, is disposed on a stitched portion to be joined.

③ Provided that the lower electrode (generally, in the form of plate) is equipped with a mold, a method in which the elastic sheet which is shaped to a mold is applied to the lower mold by an adhesive, or a method in which the sheet is overlaid covering the stitches to be bonded.

④ A method in which the sheet is applied to both the upper electrode and the lower electrode.

In the invention, high-frequency welding conditions may be selected from those conventionally employed. Especially for waterproof clothes, it is preferable, for shaping clothes with a silhouette conforming to a wearer's body, that every collar sewing, sleeve sewing, lower sleeve edge, arm hole, or the like is held between the upper and lower electrode molds, which are shaped to the curved configuration. For the seams in a seat pocket, epaulette, breast pocket, center back seam, side zipper, it is preferred that dimensional shape and size of the upper and lower electrode molds are matched with the configurations of the respective stitched portions.

BEST MODE FOR CARRYING OUT THE INVENTION

The joining seam structure of the present invention includes various embodiments of joining structures as shown in FIG. 1 through FIG. 12. These embodiments can be equally applied to obtain clothes such as sports wear, work wear, uniforms and wear generally belonging to rain gear, and can be produced by sewing optionally shaped pieces cut out of a waterproof fabric which is composed of a base fabric and a water-impermeable coating of thermoplastic elastomers coated on the surface thereof.

The welt seam mentioned herein is included categorically in a type of seam which is of a lapped seam type, and it is readily understood from the embodiments shown in FIG. 1 through FIG. 12 that the seam is suitable for use as a joining seam portion for waterproof clothes such as a waterproof working wear and waterproof uniform (coat, trousers, loose jacket, blouson and the like).

Figure 1:
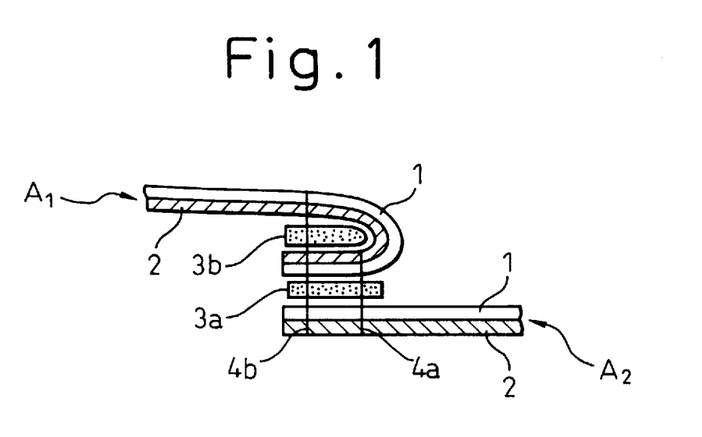
FIG. 1 illustrates the joining structure as seen in cross-section of a waterproof fabric of the invention in which the structure of the overlap consisting of waterproof fabrics, hot-melt resin layers and joining stitches sewn up by a sewing machine.
Figure 2:
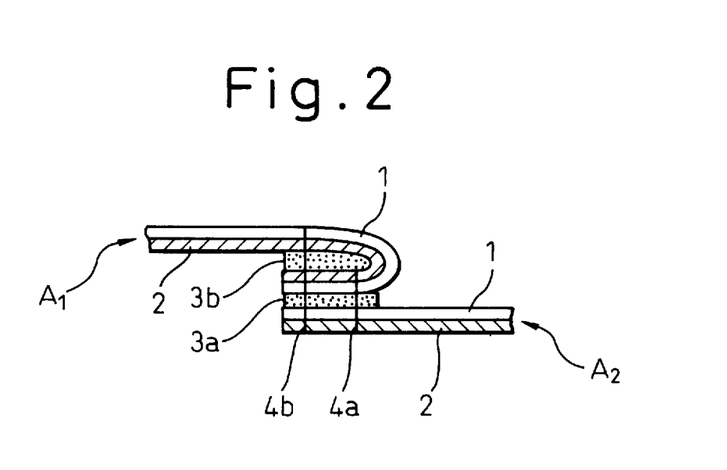
FIG. 2 shows a cross-section of the joining seam structure obtained by applying a high-frequency welder according to the present invention to the joining seam structure as shown in FIG. 1.
Figure 3:
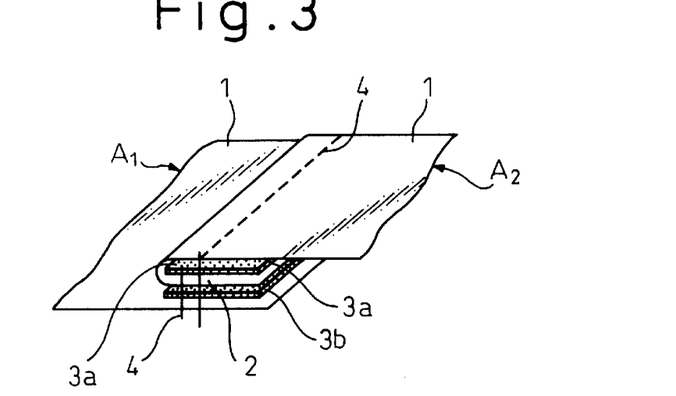
FIG. 3 is a perspective view illustrating an embodiment of the overlapping structure of the joining seam structure shown in FIG. 1.

Referring to FIG. 1 through FIG. 3, there is explained, by way of start, the principle of a most simple joining structure for forming a junction in a garment according to the invention.

In FIG. 1 ($A_1$) and ($A_2$) is shown an air permeable waterproof fabric composed of a woven or knitted base fabric (2) which is coated with a water permeable and waterproof soft polyurethane resin layer (1). Air permeable waterproof fabrics ($A_1$) and ($A_2$) are placed on top the other with the respective of resin layers (1) facing each other so that the edges of the fabrics are flash (set even) (trimmedeven). A hot-melt resin sheet piece (3a), for example, a copolyamide spun bond sheet, is applied to the edge portion of the overlapping layers which is sewn together by means of polyesters sewing machine thread (4a), and hot-melt resin sheet (3b) is placed on the surface of the base fabric of air permeable waterproof fabric ($A_1$) mentioned above. After air permeable waterproof fabric ($A_1$) is folded back down to hot-melt resin sheet (6b) mentioned above so as to wrap the hot-melt resin sheet (6), the folded back air permeable waterproof fabric ($A_1$), air permeable waterproof fabric ($A_2$) and hot-melt resin sheet (3a) and (3b) are sewn together to form a welt seam structure.

Figure 4:
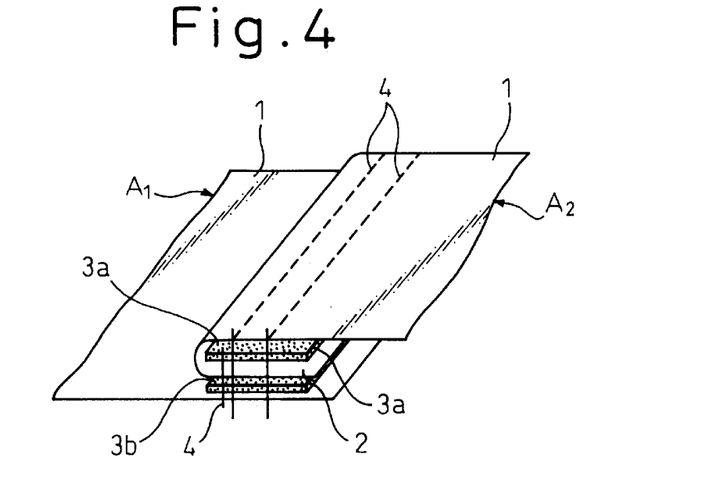
FIG. 4 illustrates a perspective view of a joining seam structure containing 2 lines of plain stitching work as applied to the structure shown in FIG. 3.

The welt seam portion is, then, heated by pressing by means of an electrode-mold (iron) of a high-frequency welder with interposition of an insulating elastic sheet therebetween, and hot-melt resin layers (3a) and (3b) are melted forming a uniform melt layers so that a highly durable waterproof joining structure, having a soft feeling with a pleasing appearance, is obtained. In the application of high-frequency welding, an interposition of an insulating elastic sheet able to prevent the air permeable waterproof coating (1) from deterioration, and to cause the hot-melt resin sheets (3a) and (3b) exclusively to melt, and thereby an improved joining structure characterized by the invention can be formed. FIG. 4 is an example of the joining structure in which a row of stitches is added in the joining structure of FIG. 3.

In order to form an improved joining structure as explained above, in which a deviation of pealing strength values is surprisingly improved as shown in the foregoing examples, it is preferable not only that selection is made of a hot-melt resin material having a dielectric coefficient of from 4.0 to 4.7 and dielectric power factor of from 0.05 to 0.13, but also that a high-frequency welding is carried out with an interposition of an insulating elastic sheet of a resin having high softening and melting points such as silicon resin having an excellent compressive recovery and a thickness change ratio at a compression load of 2 kg/cm$^2$ ranging from 4/5 to 1/10. In practice, selection of the sheet material should be made regarding its properties and specifications.

FIG. 5 through FIG. 12 are schematic representations of variations of joining structures of the invention in accordance with the essential concept of the method for forming the joining structure as mentioned above.

In these figures, the respective arrangements of polyurethane resin coated layers (1), base fabric (2) of the waterproof fabrics, hot-melt resin sheet pieces (3), sewing thread (4) and the like which make each joining structure are schematically represented for the sake of simplified illustrations.

Figure 5:
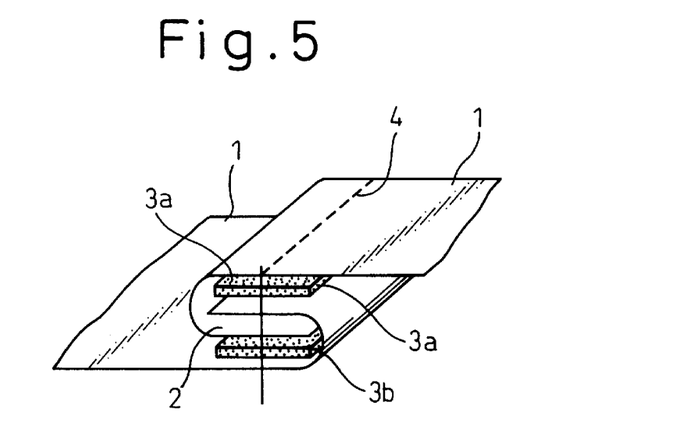
FIG. 5 is a perspective view illustrating a mode of the overlap of joining structure of the invention in which a so-called takonui seam (note: JIS L 0121-1984 2.04.02) is incorporated.
Figure 6:
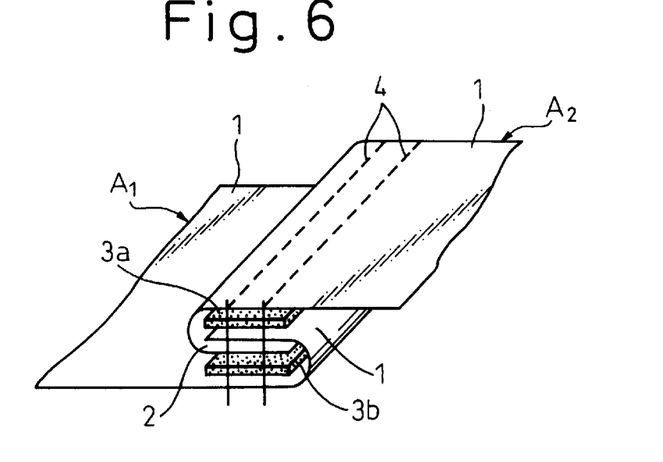
FIG. 6 is a perspective view showing a joining seam structure of the invention in which two lines of stitches are formed in the joining structure shown in FIG. 5.

In FIG. 5 through FIG. 6, there are shown joining structures in which hot-melt resin sheet pieces (3a) and (3b) are incorporated with a joining seam style called takonui seam (note: JIS L 0121-1984 2.04.02), which covers a wide range of uses as a lapped seam for cut cloth pieces which make up a garment. The joining structures contain hot-melt resin sheet pieces (3a) and (3b) in combination in which hot-melt resin sheet piece (3a) is sandwiched in between the respective faces of the base fabrics on the reverse side of polyurethane coating layers (1) of waterproof fabrics ($A_1$) and ($A_2$) to form a first overlap (superpose), and the respective ends of waterproof fabric ($A_1$) and ($A_2$) are crossed over one on the other disposing their polyurethane layers (1) face toface with hot-melt resin layer (3b) therebetween to form a second overlap (lamination) thereby forming a whole joining structure. This embodiment enables the joining structure to attain a waterproof property of a high level against water from outside by means of hot-melt resin sheet piece (3b), and provides a waterproofed high-tenacity joining structure having fraying resistance and resistance to slippage of stitches due to the adaptation of a takonui seam. It is a waterproofed high-tenacity joining structure which is suitable for providing raincoats and uniforms with a lapped seam. FIG. 6 shows a variation of the joining structure shown in FIG. 5 in which an additional row of stitches is used.

Figure 7:
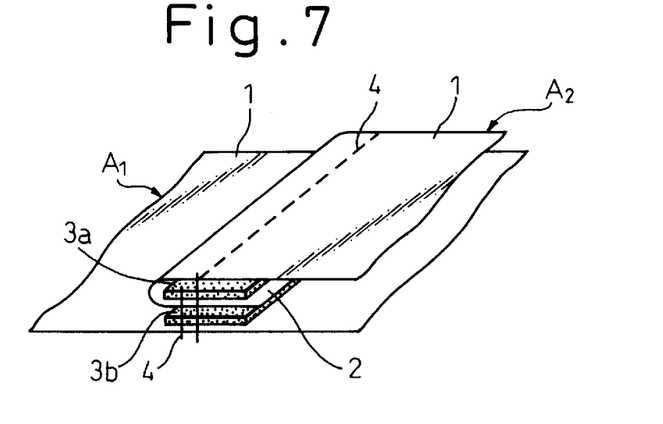
FIG. 7 is a perspective view illustrating the overlap of a joining structure of the invention in which a joining seam conventionally called katabusenui seam (note: JIS L 0121-1984 2.04.02) is formed.
Figure 8:
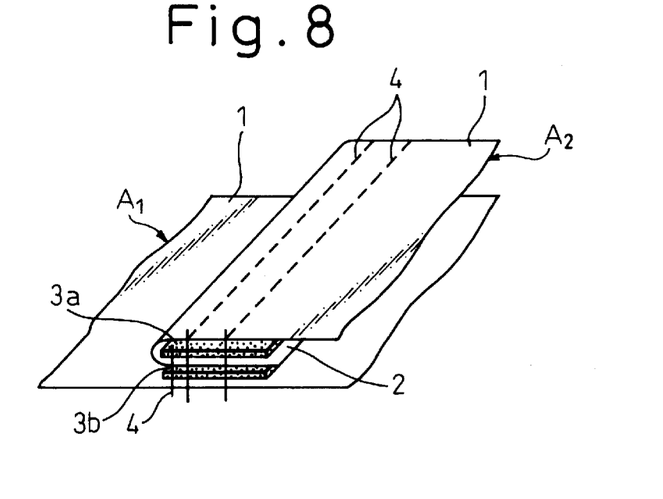
FIG. 8 is a perspective view showing the overlap of a joining structure of the invention in which two lines of stitches are formed in the joining structure shown in FIG. 7.

FIG. 7 illustrates a joining structure containing a so called katabusenui seam (note: JIS L 0121-1984 2.04.02) in which an overlap including hot-melt resin sheet pieces (3a) and (3b) are sewn together disposing hot-melt resin sheet (3b) on the surface of waterproof synthetic resin layer (1) of waterproof fabric ($A_1$) disposed on the bodice side so as to form a waterproof joining structure. The joining structure can be used for providing a heraldry (Wappen) and pockets of clothes with a durable waterproof joining means. FIG. 8 shows a variation of the joining structure illustrated in FIG. 7 in which an additional row of seams is used.

Figure 9:
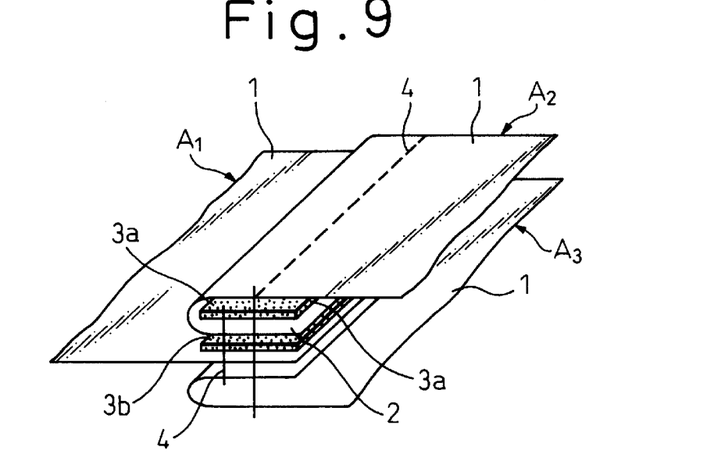
FIG. 9 is a perspective view illustrating a mode of overlap in the joining structure of the invention in which a joining seam conventionally called a yoke stitch (note: JIS L 0121-1984 2.42.02) seam is formed.
Figure 10:
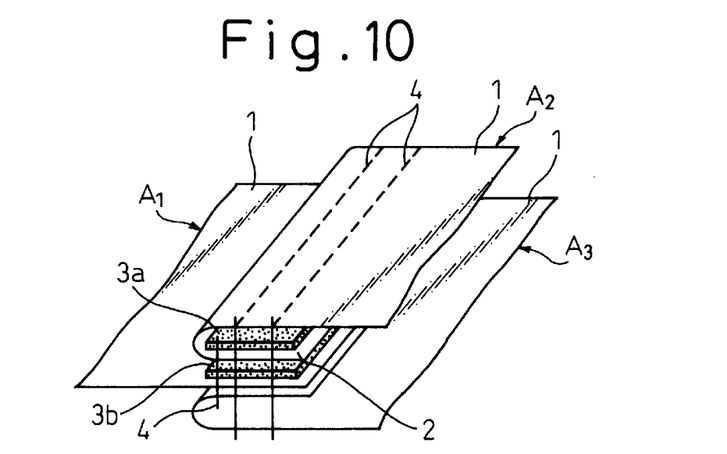
FIG. 10 is a perspective view showing a joining structure of the invention in which two lines of stitches are formed in the joining structure shown in FIG. 9.

FIG. 9 illustrates a joining structure composed of waterproof fabric ($A_1$) as the cut-cloth piece, waterproof fabric ($A_2$) and ($A_3$) as the yoke cloth pieces. The joining structure attains to waterproof property by forming a joining seam structure containing hot-melt resin sheet piece (3b) superposed to form a so-called yoke seam (sewing method; JIS L 0121-1984 2.42.02). FIG. 10 represents a variation of the joining structure illustrated in FIG. 7 in which a row of seam is further added to the structure as shown in FIG. 9.

Figure 11:
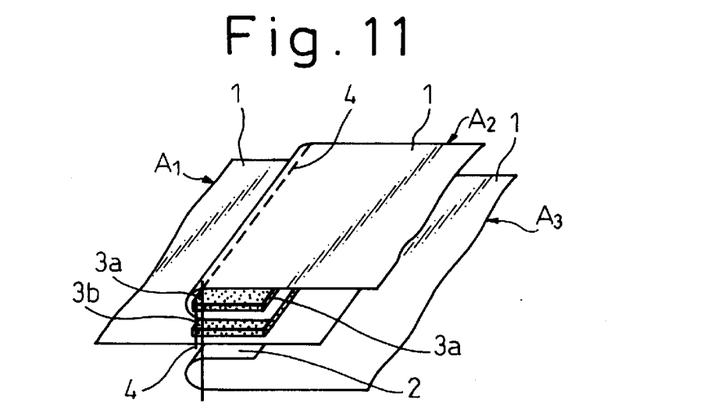
FIG. 11 is a perspective view illustrating a mode of overlap forming a joining structure of the invention in which a joining seam which is conventionally called Koba stitch (plain seam or top stitch) is applied.

FIG. 11 illustrates a formation of a waterproof joining structure in which hot-melt resin piece (3b) is interposed in a yoke seam with the use of plain stitch (top stitch).

Figure 12:
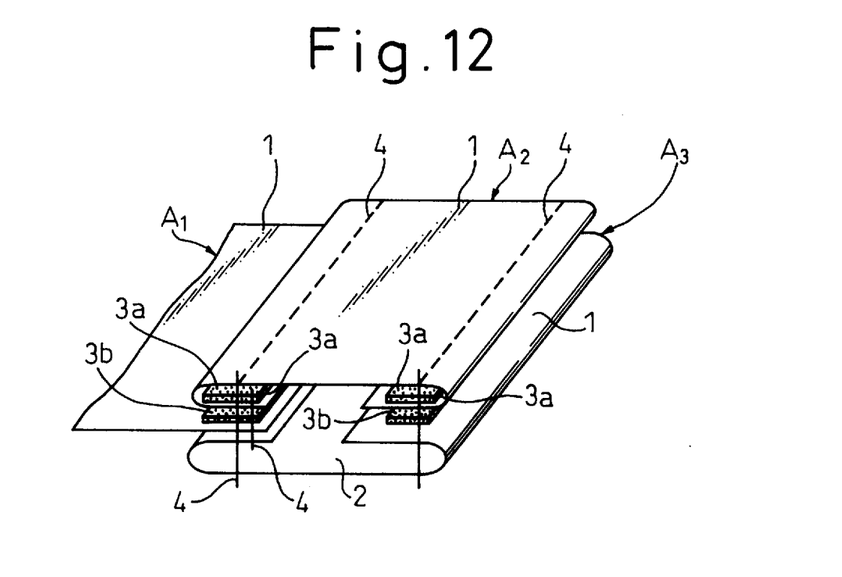
FIG. 12 a perspective view showing a mode of overlap of a joining structure according to the invention in which a welt seam is formed in a reinforced front seam.

FIG. 12 represents a waterproof joining structure which is obtained by incorporating hot-melt resin sheet pieces (3a) and (3b) in a fly front reinforced welt seam joining structure.

The joining structure in accordance with the embodiments mentioned above can be obtained by an application of a specific high-frequency welding method as mentioned above in which only hot melt resin sheet pieces (3a) and (3b) are first caused to be melted so as to spread the hot-melt resin in a thin uniform film into the gaps formed between the opposing faces of the waterproof fabrics in contact each other so that the hot-melt resin fills up the needle holes of the stitches and rugged faces existing in the layers, and thereby a waterproof joining structure having a soft hand touch with a pleasing appearance, which exhibits a property capable of preventing water from permeation from outside through the synthetic resin layer, can be obtained.

The following examples will illustrate more clearly the above-mentioned joining structures and their advantageous merits.

EXAMPLES

The invention is further explained in detail by the following Examples. In the Examples, the joining structures are evaluated in accordance with the methods as described below:

(1) Measurement of peeling strength of a joining structure portion

The measurement was carried out according to testing for seam strength as indicated in JIS-L-1993. Variance of peeling strength was obtained by test method for peeling strength according to JIS L-1086.

(2) Method for evaluating bending stiffness of a joining structure portion

A compression test machine, Type KBS-PB3 (available from KATO TECH Co.) was used. A bent distance between the bending supports for a specimen (2 cm width) was read when a load of 50 gf/cm² was imposed on a specimen of the sample. Bending stiffness of the specimen was calculated by the formula as follows:

$$B = \frac{f \cdot d^2}{2.87 \times D} \quad (gf \cdot cm^2/cm)$$

B: bending stiffness (gf·cm²/cm²), f: load, d: bent distance between the bending supports, D: width of a specimen (3) Measurement of a water resistance Initial water resistance on a sample was measured according to test method as indicated in JIS-L-1092. Water resistance was measured on a sample after it was treated by a 1,000 time-repeated rubbing in accordance with abrasion resistance B Method (Scott shape method) as indicated by JIS-L-1096.

1) Specimens 15 cm×15 cm
2) Joining structure portion of a specimen was held by clamps 2 cm apart
3) Repetition of rubbing is given for a distance of 4 cm under zero pressing load
4) rate of beating 120±2 times/min (4) Evaluation of dynamic water leaking property As a means for an evaluation of a joining structure under a dynamic condition at wearing, textile water resistance tester (Bundesman method) in Reference Test C as indicated in JIS-L-1092 was employed. A specimen was treated at a quasi-rainfall of 200 ml/min./100 cm², and the appearance regarding water leaking (an area of water spot:evaluated by permeation rate as defined below) of the treated specimen was photographed (leaking area was clearly observed as dark shaded) for the evaluation.

$$\text{Permeation rate } (\%) = \frac{\text{area of water spot}}{\text{tested area of water resistance test (a circle of a diameter of 80 mm)}} \times 100$$

Example 1

A napped half tricot stitch fabric (cupra yarn 75d/36f, nylon 66 yarn 30d/12f; density course 65 G, wale 28 G)

having a basis weight of 185 g/m² composed of 80% of cuprammonium rayon and 20% of nylon 66 was used for the base fabric. A polyurethane film was coated with a two-pack type polyurethane adhesive having a composition as indicated in the undermentioned (2) below. The polyurethane film was prepared by the method as indicated in the undermentioned (1) and had a basis of weight of 35 g/m². The polyurethane film has a melting point of 165° C., a dielectric constant of 3.8 at an impressed frequency of $1 \times 10^6$ HZ at 20° C. and a dielectric power factor of 0.03. A waterproof fabric was prepared by caleder-coating with the film mentioned above.

Two pieces of the waterproof fabrics were laid on top the other at the respective ends with the respective polyurethane layer films face to face. Onto the two-layered portion, a band 10 mm wide of Daiamid 1400 (a spun bond like copolyamide hot-melt resin) which was available from Dicel Chemical Industries Co., Ltd., was laid. The hot-resin material has a basis of weight of 100 g/m², a melting point of 100° C., a dielectric constant of 4.3 measured under an impressed frequency of $1 \times 10^6$ HZ at 20° C. and a dielectric power factor of 0.09. The superposed layers en bloc were then joined together forming a stitching line 0.09 mm inwards from the flush end with a polyester sewing thread No. 40 by a sewing machine (plain stitch: stitching pitch 4.5 needles/cm) (see FIG. 4a). Thereafter, the upper waterproof fabric of the joined superposed layer portion was folded back along the line of stitches so that another sealing material as mentioned above was disposed in the fold which formed a joint cloth composed of the napped tricot fabric 6 mm inwards from the outside end of the fold with a polyester sewing thread No. 40 by a lock stitch sewing machine (plain seam : stitching pitch 4 needles/cm) to make a unitary joined seam structure (see FIG. 4b). Using a high-frequency welder available from Seidensha Inc., the joined structure portion was further treated with an interposition of a 5 mm thick silicon rubber between the stitched portion and the electrode of the welder to effect a hot press adhesion. The high-frequency welding conditions were; applied frequency, 40 MHZ; calibration of modulation, 4.5; duration of oscillation, 7 seconds; pressure, 3.0 kg/cm², anode current, 0.34 A.

As a result, there was obtained a joining structure having a soft hand-touch in which only the spun bond like copolyamide hot-melt resin was sufficiently melted with uniformity. It was found that there was no observable change in the polyurethane layer of the waterproof fabric. The evaluations of the joining structure are shown in Table 1.

(1) A film having a basis of weight of 10 g/m² was prepared by coating a polyurethane solution on a sheet of a peeling paper (EV130TP[R-4], KOUTEISHI available from LINTEC Inc.) followed by drying at 60° C. and 100° C. for one minute each. The formulation of the coating solution is as follows:

| | |
|---|---|
| Polyurethane (LACKSKIN 390, a product of SEIKO CHEMICAL CO., LTD. KASEI) | 60 wt % |
| Dimethylformaide | 40 wt % |

(2) A two-pack type polyurethane adhesive solution (1) was coated on a film prepared by method (1) using a roll coater followed by drying at 80° C. for one minute. The amount of the coated adhesive was 25 g/m². The adhesive solution had the formulation given below:

| | |
|---|---|
| CRISVON 4160 LV (an adhesive available from DAINIHON INK CO., LTD.) | 70 parts |
| BARNOKK DN950 (a cross-linking agent available from DAINIHON INK CO., LTD) | 7 parts |
| ACCEL T (a cross-linking accelerator agent available from DAINIHON INK Co., LTD.) | 3 parts |
| Methylethylketone | 10 parts |
| Dimethylformamide | 10 parts |

Example 2

A napped tricot fabric composed of 80% of cuprammonium rayon and 20% of nylon 66 was used as the base fabric; basis weight, 185 g/m². A waterproof fabric was prepared by calender-bonding a polyurethane film coated with a two-packed polyurethane adhesive to the base fabric. The polyurethane film had a basis of weight of 35 g/m² and had a melting point of 165° C., a dielectric coefficient of 3.6 at 20° C. under $1 \times 10^6$ HZ and a dielectric power factor of 0.03.

The end portions of the waterproof fabrics were laid one over the other with their polyurethane layer sides face to face, and to the two-layered portion, a 10 mm wide hot-melt spunbond like copolyamide resin was disposed. The hot melt resin material had a basis of weight of 100 g/m² and had a melting point of 100° C., a dielectric coefficient of 4.3 at 20° C. under an applied frequency of $1 \times 10^6$ HZ, a dielectric power factor of 0.09. The superposed layers en bloc were joined together with the use of polyester sewing thread No. 40 (see FIG. 14a). The upper waterproof fabric of the joined portion was folded back along the stitched line with the napped tricot face inside into which another same sealing material as mentioned above was disposed. The whole overlaid portion thereby formed was sewn in plain stitch to make a joining seam structure. The joining seam structure was treated by a high-frequency welder to effect a hot press adhesion in the joining structure in the same manner and conditions as used in Example 1.

As a result, there was obtained a joining structure with soft hand touch in which only the spun bond like copolyamide hot-melt resin was sufficiently melted with uniformity. It was found that there was no observable change in the polyurethane layer of the waterproof fabric. The evaluations of the joining structure are shown in Table 1.

Example 3

A joining structure portion containing waterproofed seam structure was obtained according to the manner as described in Example 1 except that use was made of a napped plain weave fabric (40 ends/inch, 41 picks/inch) as the base fabric. The napped plain fabric was woven from spun yarns (Nm: weft yarn ½0; filling yarn ⅔0) consisting of 65% of polyester and 35% of rayon and had a basis of weight of 180 g/m².

It was found that only the spun bond like copolyamide hot-melt resin in the joining structure was sufficiently melted with uniformity to form a joining structure with a soft hand feeling. Results of evaluations of the joining structure are presented in Table 1.

Example 4

With the use of the base fabric used in Example 3, a waterproofed seam structure was produced according to the method as that of Example 2. The hot-melt sealing material in the seam structure was melted all over and a stiffness of the seam structure was of low. Evaluation of the resultant joining are presented in Table 1.

Example 5

A plain weave fabric (136 ends/inch, 104 picks/inch) which was finished with a water repellent agent was used as the base fabric of a waterproof fabric. The plain weave fabric was composed of 100% nylon 66 filaments yarn and had a basis of weight of 100 g/m$^2$. A waterproof fabric having a waterproofed joining structure was prepared according to the method in Example 1 except that the base fabric mentioned above was wet-coated over the surface thereof with a polyurethane resin having a melting point of 180° C., a dielectric coefficient of 3.9° to 20° C. under an applying frequency of 1×10$^6$ and a dielectric power factor of 0.04.

The urethane resin coating layers contained in the joining structure portion undergo no change and the hot-melt resin alone was melted throughout forming a soft joining portion with a soft texture. Evaluations are summarized in Table 1.

Comparative Example 1

Excepting that treating by a heated plate ironing (temperature 130° C., period of time 10 seconds, pressure 1.5 kg) was employed in place of the hot press adhesion by means of the high-frequency welder, a waterproof fabric was obtained in accordance with the method of Example 1. The resultant product had a low joining strength and exhibited a poor water resistance. Results of evaluations are shown in Table 1.

Comparative Example 2

A waterproof joining portion was obtained by the method according to as described in Example 2 except with the use of the hot press adhesion is made of the method in Comparative Example 1. The result obtained was similar to that of Comparative Example 1. Results of evaluations are shown in Table 1.

Comparative Example 3

Waterproof joining structures were formed by a method according to Example 1 except that the interposition of silicon rubber between the electrode and the stitched portions was omitted when the hot melt press adhesion bonding was carried out by the high-frequency welder. The resulted joining structure had relatively greater stiffness, wide variations in peeling strength and poor durability of water resistance. Results of evaluations are shown in Table 1.

Comparative Example 4

Waterproof joining structures were formed by a method according to Example 2 except that the same modification as that in Comparative Example 3 was employed.

The obtained joining structures had relatively greater stiffness and wide variations in peeling strength. Results of evaluations are shown in Table 1.

Comparative Example 5

Waterproof joining structures were formed by a method according to Example 5 except that the same modification as that in Comparative Example 3 was employed.

The obtained joining structures had relatively greater stiffness and wide variations in peeling strength. Results of evaluations are shown in Table 1.

It is clearly shown, in comparison with Comparative Examples 1 through 5, that all the waterproof fabrics provided with the joining seam structures obtained by Examples 1 through 5 have an excellent durability of waterproof and superb hand touch, hence the fabrics can make clothes which fit wearer to a nicety and at the same time waterproof properties are durable without deterioration after prolonged wearing and even after repeated wearing of the clothes.

TABLE 1

Comparison of joining structures of Water proof fabric between Examples and Comparative Examples

| | Material | | | Dielectric coefficient | | Dielectric power factor | | Melting point (°C.) | |
|---|---|---|---|---|---|---|---|---|---|
| | Basic fabric | Waterproof film layer | Hot-melt sealing material | Waterproof film | Hot-melt sealing material | Waterproof film | Hot-melt sealing material | Waterproof film | Hot-melt sealing material |
| Example | | | | | | | | | |
| 1 | Cupra 80% | Polyurethane | Polyamide | 3.6 | 4.3 | 0.03 | 0.09 | 165 | 100 |
| 2 | Nylon 20% Napped tricot | (35 g/m$^2$) | copolymer (Spun bond-like) | | | | | | |
| 3 | Polyester 65% | Polyurethane | Polyamide | 3.6 | 4.3 | 0.03 | 0.09 | 165 | 100 |
| 4 | Rayon 35% Napped fabric | (35 g/m$^2$) | copolymer (Spun bond-like) | | | | | | |
| 5 | Nylon 100% Water repellent fabric | Polyurethane (20 g/m$^2$) | Polyamide copolymer | 3.9 | 4.3 | 0.04 | 0.09 | 180 | 100 |
| Comparative Example | | | | | | | | | |
| 1 | Cupra 80% | Polyurethane | Polyamide | 3.6 | 4.3 | 0.03 | 0.09 | 165 | 100 |
| 2 | Nylon 20% Napped tricot | (35 g/m$^2$) | copolymer (Spun bond-like) Polyamide copolymer (Film- | | | | | | |

TABLE 1-continued

Comparison of joining structures of Water proof fabric between Examples and Comparative Examples

| | | | like) Polyamide copolymer (Spun bond-like) | | | | | | |
|---|---|---|---|---|---|---|---|---|---|
| 3 | | | | | | | | | |
| 4 | | | | | | | | | |
| 5 | Nylon 100% Water repellent fabric | Polyurethane (20 g/m²) | Polyamide copolymer | 3.9 | 4.3 | 0.04 | 0.09 | 180 | 100 |

| | | | | Characteristics of waterproof clothes | | | | | |
|---|---|---|---|---|---|---|---|---|---|
| | | | | | Peeling strength | | | Water resistance | Textile water resistance test |
| | | High-frequency welding elastic sheet | Bond strength (kg/2.5 cm width) | Mean strength (kg/10 mm width) | Standard deviation of strength (σ) | Degree of variability of strength (%) | Bending stiffness (gf·cm²/cm) | (mm H₂O) | (Bundesmann) |
| | Sewing stitches | | | | | | | Initial value / After 1,000 times of rubbing | permeation rate (%) |
| Example | | | | | | | | | |
| 1 | ○ | ○ | 32.3 | 3.73 | 0.186 | 5.0 | 18.3 | 1250 / 1100 | 12.1 |
| 2 | x | ○ | 30.4 | 2.77 | 0.234 | 8.8 | 11.9 | more than 5000 / more than 5000 | 0 |
| 3 | ○ | ○ | 29.6 | 2.74 | 0.167 | 6.1 | 19.2 | 1100 / 1000 | 13.4 |
| 4 | x | ○ | 28.5 | 2.66 | 0.210 | 7.2 | 14.6 | more than 5000 / more than 5000 | 0 |
| 5 | ○ | ○ | 26.7 | 2.54 | 0.102 | 4.0 | 8.7 | 1000 / 950 | 15.8 |
| Comparative Example | | | | | | | | | |
| 1 | ○ | Heated plate (ironing) | 20.6 | 1.27 | 0.133 | 10.5 | 13.3 | 400 / 400 | 97.3 |
| 2 | ○ | Heated plate (ironing) | 22.4 | 1.44 | 0.262 | 18.2 | 19.2 | 500 / 500 | 90.1 |
| 3 | ○ | x | 32.6 | 3.29 | 0.860 | 26.1 | 26.8 | 1000 / 750 | 72.6 |
| 4 | x | x | 31.5 | 3.02 | 0.864 | 28.6 | 24.4 | 5000 / 5000 | 0 |
| 5 | ○ | x | 26.1 | 3.11 | 0.945 | 30.4 | 16.5 | 900 / 600 | 85.5 |

Note 1:
In "Sewn stitches" column, "○" denotes "stitched, and "x", not stitched.
Note 2:
In "High-frequency welding elastic sheet" column, "○" denotes use of the sheet and "x", use of sheet in sheet omitted.

Industrial Applicability

A joining structure for a waterproof fabric in accordance with the invention has a resistance to hydrostatic pressure of 800 mm H₂O or more, and the property of water resistance can bear repeated abrasion. A joining structure of the invention can be used for manufacturing clothes of a waterproof fabric provided with an improved joining seam structure because its appearance and softness property can match those of conventional clothes and it can stand comparison with a joining seam structure of conventional clothes.

We claim:

1. A joining structure for a waterproof fabric which contains a welt seam joining an overlap of two layers laid one on top of the other of the waterproof fabrics composed of a thermoplastic resin film layer adhered to on one surface of a base fabric, characterized in that the overlapping layers of the waterproof fabrics are bonded together with an interposed hot-melt resin adhesive layer at the welt seam joining portion, and the welt seam portion has the properties satisfying the following formulae:

(1) bond strength ≧25 kg/25 cm width
(2) bending stiffness ≦20 gf·cm²/cm
(3) water resistance after rubbing 1,000 times according to Scott shape method ≧800 mm H₂O.

2. A joining structure for a waterproof fabric according to claim 1, in which the welt seam portion is formed of a folded back portion of one waterproof fabric with its base fabric inside with an interposition of a hot-melt resin adhesive layer to which the face of the resin film layer of the other waterproof fabric is bonded in an overlapping manner by another interposed hot melt resin layer.

3. A joining structure for a waterproof fabric according to claim 1, in which the welt seam portion comprises a first waterproof fabric folded back with its fiber surface of the base fabric facing inside while holding a hot-melt resin layer in the fold, a second waterproof fabric folded back with its resin coated film layer facing inside while holding another hot-melt resin layer in the fold, and the folds being laid in an overlapping manner so that each coating layer of the respective waterproof fabrics at the end of the respective folds is in contact with the hot-melt resin layer held by each other fold to effect melt adhesion bond.

4. A joining structure for a waterproof fabric according to any one of the preceding claims, in which the waterproof fabric is an air permeable waterproof fabric.

5. A method for forming a joining structure for a waterproof fabric by a process including laminating a base fabric and a resin film to produce a waterproof fabric; joining waterproof fabrics to form a welt seam with a hot-melt resin layer having a product of dielectric constant and dielectric power factor of from 0.2 to 0.6; applying a high-frequency treatment to a welt seam portion to effect bonding, the high frequency treatment is characterized in that a high-frequency current is applied by an electrode to the welt seam portion in a condition in which an insulating elastic sheet having a product of dielectric constant and dielectric power factor less than half of the hot-melt resin layer is interposed between the welt seam portion and electrode to form an adhesive bond by the hot-melt resin under a press.

6. A method of forming a joining structure for a waterproof fabric according to claim 5, in which the hot-melt resin has a dielectric coefficient of from 4.0 to 4.7.

7. A method of forming a joining structure for a waterproof fabric according to claim 5, in which the insulating elastic sheet is a silicon resin sheet.

* * * * *